United States Patent [19]

Rogers

[11] Patent Number: 5,318,227

[45] Date of Patent: Jun. 7, 1994

[54] BENEFICIATION OF DRY SCRUBBER PRODUCT

[75] Inventor: Kevin J. Rogers, Wadsworth, Ohio

[73] Assignee: The Babcock & Wilcox Company, New Orleans, La.

[21] Appl. No.: 15,956

[22] Filed: Feb. 8, 1993

[51] Int. Cl.$^5$ .............................................. B02C 23/20
[52] U.S. Cl. .................................... 241/16; 241/19; 241/24
[58] Field of Search .............. 241/16, 19, 24; 209/2, 209/3, 133, 134, 144

[56] References Cited

U.S. PATENT DOCUMENTS

| | | | |
|---|---|---|---|
| 3,522,012 | 7/1970 | Blann | 209/134 X |
| 3,854,666 | 12/1974 | Switzer, Jr. | 241/18 |
| 4,276,062 | 6/1981 | Lyon et al. | 55/77 |
| 4,586,660 | 5/1986 | Stiller et al. | 241/24 |
| 4,588,559 | 5/1986 | Emmett | 209/3 X |

FOREIGN PATENT DOCUMENTS

| | | | |
|---|---|---|---|
| 2314754 | 1/1977 | France | 209/134 |
| 244450 | 10/1987 | Japan | 241/19 |

*Primary Examiner*—Mark Rosenbaum
*Assistant Examiner*—Frances Han
*Attorney, Agent, or Firm*—Robert J. Edwards; Michael L. Hoelter

[57] ABSTRACT

A process of beneficiation of a dry flue gas desulfurization end product into separate dry particle streams dependant upon particle size, density, or shape. Further refinement of the dry end product is accomplished by initially comminuting the end product prior to classification by size, density, or shape.

4 Claims, 1 Drawing Sheet

BENEFICIATION OF DRY SCRUBBER PRODUCT

FIELD OF THE INVENTION

This invention pertains to the end product of a dry scrubber/spray dryer used in the desulfurization of flue gas and more particularly to a means of separating or classifying this dry end product into different categories whose constituents are composed of roughly the same content.

BACKGROUND OF THE INVENTION

The end product of a dry flue gas desulfurization process is a dry bulk solid composed of relatively fine particle sizes. This bulk solid includes compounds from both the combustion process which generated the flue gas and reaction products from the desulfurization process. Typical constituents of this bulk solid consist of flyash, sulfur based reaction products (such as calcium sulfite and calcium sulfate compounds), un-used reagent (such as excess lime), and relatively inert compounds that were present in the fresh reagent supply.

In some cases, the bulk solid was disposed of in the best manner possible, such as in a landfill. In other cases, attempts were made to retrieve some or all of the unused reagents or other compounds for recycling or for further utilization with the remainder then being disposed of. These methods of recycling employed make-up water or other liquid so as to separate the desired component from the bulk solid. However, no attempt was made to classify or categorize this bulk solid into its component parts using dry classifiers so that further uses could be found thereby recycling a greater percentage of the bulk solid and/or reducing or eliminating the need for further landfilling. As contemplated by this invention, a dry classification scheme would be implemented which utilizes air as the motive fluid in conjunction with or assisted by mechanical action so as to classify the bulk solids into a fine and a coarse solids stream.

Additionally, in the past, when such portions were removed from the flue gas desulfurization end product stream, the particle size of the portion removed was not consistent. This was due, for example, to some of the to-be-recycled lime being agglomerated into larger particles, or conversely, to the desired fines being contained within the larger particles and thus not being collected. In accordance with this invention, the larger end product particles may, if such is desired, be reduced in size by comminution which also liberates the fines such larger particles contain. In this fashion, a greater portion of the desired end product is available for subsequent separation and classification.

It is thus an object of this invention to separate the end product of a flue gas desulfurization process into its component parts using a dry classification scheme. Another object of this invention is to achieve classification so that like components may be gathered and collected together for further use or implementation. Still another object of this invention is to classify the bulk solids by size which, in turn, will result in the desirable classification by content due to the variations in particle density between the different components of the bulk solid. Yet another object of this invention is to remove and dispose of only that portion of the bulk solid which is in need of being landfilled with the remaining portion of the bulk solid being delivered elsewhere for subsequent utilization. These and other objects and advantages of this invention will become obvious upon further investigation.

SUMMARY OF THE INVENTION

What is disclosed is a process of beneficiation of a dry flue gas desulfurization end product. The improvement consists of the steps of: (a) delivering a dry flue gas desulfurization end product to a classifier using air as the motive fluid with this end product consisting of dry solid particles; (b) separating or classifying this end product in the classifier by particle size and/or density; (c) ejecting this end product from the classifier according to particle size and/or density; and, (d) collecting like particles together in a separate particle stream.

DETAILED DESCRIPTION OF THE DRAWING

Figure 1:
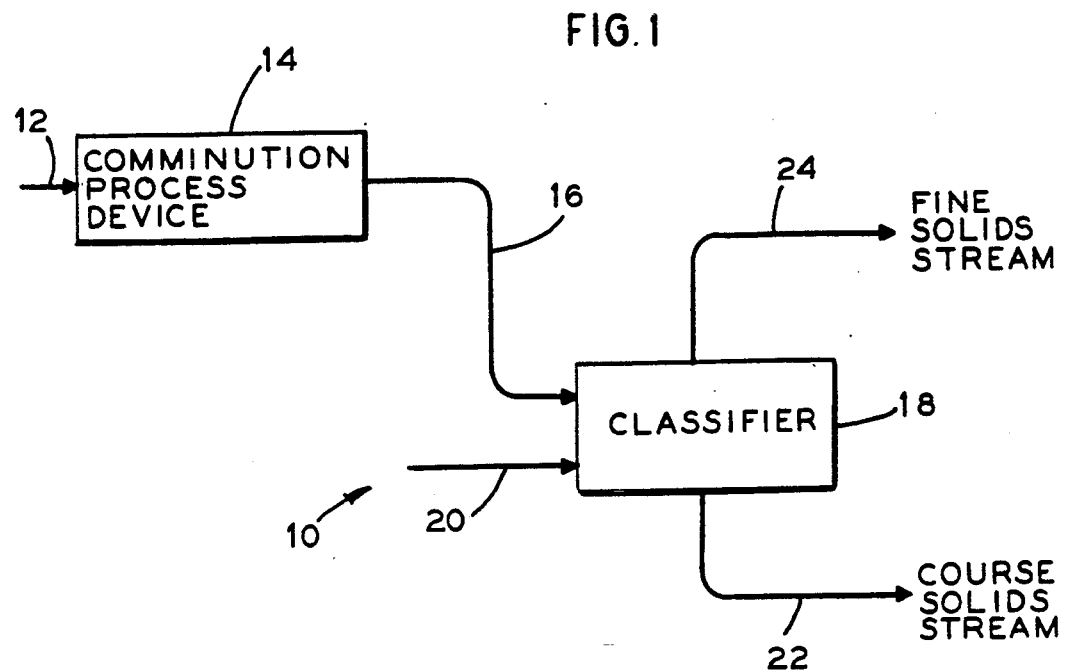
FIG. 1 is a schematic flow diagram of a typical process contemplated by this invention.

Referring to the drawing, there is shown dry classification system 10 for use with the classification of dry flue gas desulfurization end product stream 12. As shown in this configuration, dry product stream 12 initially enters optional comminution process device 14, whereby all or a portion of the particles in stream 12 are ground, attrited, or de-agglomerated. This optional comminution step serves two functions, first it breaks up any larger particles in stream 12 thereby enabling their subsequent classification; and second it liberates or releases any fine particles contained within the larger particles for their subsequent classification as well. Examples of devices to accomplish such a function are media mills, impact grinders, jet mills, etc.

The resulting comminuted material 16 leaving comminution device 14 is directed to classifier 18 where material 16 is subsequently classified based on particle size and/or particle shape and/or density. Preferably, classifier 18 would separate particles having a size greater than 10 $\mu$m from those whose size is less than 10 $\mu$m. Classifier 18 can consist of devices based solely on the solids carrier media being air 20 thereby encouraging or promoting air/particle centrifugal action. alternatively, classifier 18 can incorporate internals to achieve classification by mechanical means such as vanes or screens. In any event, air 20 required for classification and/or conveyance may enter classifier 18 at single or multiple points depending on the requirements of the specific device chosen. Examples of such classifiers 18 are, but not necessarily limited to, centrifugal air classifiers, cyclones, air sifters, spiral air classifiers, turbo air classifiers, air jet screening devices, etc. It is also possible, if desired, to combine certain comminution processes, such as impact grinding or jet milling, to wear down and/or de-agglomerate the solids within a single device that provides such classification.

The solids leaving classifier 18 do so in two separate streams, one being course solids stream 22 and the other being the fine solids stream 24. Depending on the needs of the flue gas desulfurization system and/or the potential commercial oriented or disposal waste characteristic enhancement objectives, either fine solids stream 24 or coarse solids stream 22 can be considered to be value enhanced or beneficiated. These streams 22 and 24 are enhanced by the increased degree of purity no accomplished such that a particular component or the various components of stream 12 can be concentrated and collected for later use without the need to de-water the collected product. Additionally, it should be understood, that the concentration of the individual components of streams 22 and 24 may be varied as needed.

While no control means are shown or illustrated (such as valves, pumps, motors, monitors, instrumentation, etc.) they would of course be required for this process to function properly and/or optimally. Generally, normal controls currently available for the chemical and plant process industry will also suffice for this purpose.

What is claimed is:

1. A process for beneficiation of a dry flue gas desulfurization end product wherein the improvement comprises the steps of:
    (a) delivering a dry flue gas desulfurization end product to comminution means for fines liberation, said fines liberation pertaining to particles having a size of about 10 $\mu$m, more or less;
    (b) transferring said dry flue gas desulfurization end product to a classifier using air as the motive fluid;
    (c) separating or classifying said end product in said classifier by particle size; and,
    (d) ejecting said end product from said classifier in first and second streams, said first stream collecting said end product having a size generally larger than about 10 $\mu$m and said second stream collecting said end product having a size generally smaller than about 10 $\mu$m.

2. The process as set forth in claim 1 further comprising the step of separating or classifying said end product in a classifying assembly, optionally a centrifugal air classifier, a cyclone, an air sifter, a spiral air classier, a turbo air classifier, or an air jet screening device.

3. The process as set forth in claim 2 further comprising the step of comminuting said end product using a comminuting assembly, optionally a media mill, an impact grinder, or a jet mill.

4. The process as set forth in claim 3 further comprising the step of incorporating said step of comminuting with said step of separating or classifying within a single device.

* * * * *